United States Patent
Kobida, Jr.

(10) Patent No.: US 11,627,643 B2
(45) Date of Patent: Apr. 11, 2023

(54) INDUCTION COOKTOP SYSTEM

(71) Applicant: BONBOWL, LLC, Chicago, IL (US)

(72) Inventor: Michael J. Kobida, Jr., Chicago, IL (US)

(73) Assignee: Bonbowl, LLC, Chicago, IL (US)

( * ) Notice: Subject to any disclaimer, the term of this patent is extended or adjusted under 35 U.S.C. 154(b) by 362 days.

(21) Appl. No.: 16/873,239

(22) Filed: Mar. 3, 2020

(65) Prior Publication Data

US 2020/0296807 A1 Sep. 17, 2020

Related U.S. Application Data

(60) Provisional application No. 62/817,032, filed on Mar. 12, 2019.

(51) Int. Cl.
*H05B 6/12* (2006.01)
*H05B 6/06* (2006.01)

(52) U.S. Cl.
CPC .......... *H05B 6/1245* (2013.01); *H05B 6/062* (2013.01)

(58) Field of Classification Search
CPC ... H05B 2213/07; H05B 6/1245; H05B 6/062
See application file for complete search history.

(56) References Cited

U.S. PATENT DOCUMENTS

| 2012/0132647 | A1* | 5/2012 | Beverly | H05B 6/062 |
| | | | | 219/624 |
| 2016/0014849 | A1* | 1/2016 | Hegedis | H05B 6/1272 |
| | | | | 219/627 |
| 2017/0268935 | A1* | 9/2017 | Hua | G01K 1/143 |
| 2019/0289677 | A1* | 9/2019 | Naber | H05B 6/062 |

* cited by examiner

*Primary Examiner* — Dana Ross
*Assistant Examiner* — Kuangyue Chen
(74) *Attorney, Agent, or Firm* — Paul E Schaafsma; NovusIP, LLC (57) ABSTRACT

An induction cooking system in accordance with the principals of the present invention includes an induction cooking appliance and custom cookware. The induction cooking appliance includes a cooktop surface, an induction heating system contained below the cooktop surface, and a temperature sensor. The temperature sensor sensing temperature above the cooktop surface. The induction heating system includes a coil positioned immediately below the cooktop surface. The coil is configured to produce an electromagnetic field when the coil is energized. The custom cookware is configured to be placed on the cooktop surface above the coil. The custom cookware includes an inner shell and an outer shell. The inner shell is comprised of a metallic material to heat a food material. The outer shell is comprised of a thermally insulative material that is substantially transparent to magnetic flux. The outer shell includes an underside configured to rest on the cooktop surface above the coil during cooking. The underside defines a thermal-insulation aperture through which the temperature sensor extends temperature sensing above the cooktop surface to the inner shell.

11 Claims, 6 Drawing Sheets

INDUCTION COOKTOP SYSTEM

RELATED APPLICATIONS

This application claims priority from U.S. Provisional Patent Application Ser. No. 62/817,032, filed 12 Mar. 2019 entitled "Induction Cooktop System", the disclosure of which is incorporated herein by this reference.

FIELD OF THE INVENTION

The present invention relates to induction cooktop systems.

BACKGROUND OF THE INVENTION AND STATE OF THE ART

Various forms of electric powered cooking systems are widely used throughout the world. Common devices include electric stoves, microwaves, ovens, toasters, and induction cooktops. Induction cooking utilizes electric currents to directly heat pots and pans through magnetic induction. Instead of using gas or an electric element transferring heat from a burner to a pot or pan via thermal conduction, induction heats the cooking vessel itself.

In induction cooking an electric current is passed through a coiled copper wire underneath the cooking surface, which creates a magnetic current throughout the cooking pan to produce heat. Because induction avoids use of traditional gas and electric element heat sources, only the coiled copper wire in use will heat due to heat transferring from the pot or pan. Induction cooking is more efficient than traditional electric and gas cooking because little heat energy is lost. Thus, induction cooktops have slowly been gaining popularity since introduction to the market due to speed of heat transfer, ease of operation, precise and constant temperature control, and power efficiency.

An induction cooktop usually takes an input from the user, such as cook time or temperature, and then operates on a single setting for a given amount of time. The amount of cook time is usually provided on the food package that the user is attempting to cook. Due to inconsistencies in size, shape, power, and other features involved in a system of induction cooking, food is often improperly cooked. This can lead to waste of food, waste of energy by the device, or waste of time by the user.

While various attempts have been made to address these inconsistencies, such attempts have not proven satisfactory as unduly complex and complicated, even utilizing wireless communications. Thus, what would be beneficial would be an induction cooking system that creates a more desirable user experience, decrease the time to cook meals and limits waste throughout the cooking and cleanup process.

SUMMARY OF THE INVENTION

This Summary of the Invention is provided to introduce a selection of concepts in a simplified form that are further described below in the Detailed Description section. This Summary of the Invention is not intended to identify key features or essential features of the claimed subject matter, nor is it intended to be used as an aid in determining the scope or spirit of the claimed subject matter.

An induction cooking system in accordance with the principals of the present invention creates a more desirable user experience, decrease the time to cook meals and limits waste throughout the cooking and cleanup process. An induction cooking system in accordance with the principals of the present invention includes an induction cooking appliance and custom cookware. The induction cooking appliance includes a cooktop surface, an induction heating system contained below the cooktop surface, and a temperature sensor. The temperature sensor senses temperature above the cooktop surface. The induction heating system includes a coil positioned immediately below the cooktop surface. The coil is configured to produce an electromagnetic field when the coil is energized. The custom cookware is configured to be placed on the cooktop surface above the coil. The custom cookware includes an inner shell and an outer shell. The inner shell is comprised of a metallic material to heat a food material. The outer shell is comprised of a thermally insulative material that is substantially transparent to magnetic flux. The outer shell includes an underside configured to rest on the cooktop surface above the coil during cooking. The underside defines a thermal-insulation aperture through which the temperature sensor extends temperature sensing above the cooktop surface to the inner shell.

This Summary of the Invention introduces concepts in a simplified form that are further described below in the Detailed Description. This Summary of the Invention is not intended to identify key features or essential features of the claimed subject matter, nor is it intended to be used as an aid in determining the scope of the claimed subject matter.

BRIEF DESCRIPTION OF THE DRAWINGS

The accompanying Drawings illustrate several embodiments and, together with the description, serve to explain the principles of the present invention according to the example embodiments. It will be appreciated by one skilled in the art that the particular arrangements illustrated in and described with respect to the Drawings are merely exemplary and are not to be considered as limiting of the scope or spirit of the present invention or the claims herein in any way.

As noted above, in the above reference Drawings, the present invention is illustrated by way of example, not limitation, and modifications may be made to the elements illustrated therein, as would be apparent to a person of ordinary skill in the art, without departing from the scope or spirit of the invention.

DETAILED DESCRIPTION OF EMBODIMENTS

Introduction

As previously introduced, induction cooking utilizes an electric current passed through a coiled copper wire underneath a cooking surface, which creates a magnetic current throughout the cooking pan to produce heat. Due to inconsistencies in size, shape, power, and other features involved in a system of induction cooking, food is often improperly cooked. This can lead to waste of food, waste of energy by the device, or waste of time by the user.

For example, most cookware is designed to be used on a gas or electric stovetop, and is not optimized specifically for induction cooktops. Additionally, the food is usually cooked in a container that is specifically designed for cooking purposes and not for eating, which creates extra dirty dishes to clean after the user eats the meal, or extra waste that the user must dispose of. After cooking a meal, the cookware is oftentimes too hot to touch and requires the user to insulate their hands with a hot mitt or similar solution while they transfer the food to a cold dish to eat out of. All of the added steps of cooking a food, such as pasta, make for a time consuming and wasteful process.

An induction cooktop system in accordance with the principals of the present invention allows the user to cook food on an induction cooktop, with induction-specific cookware that also doubles as a vessel from which the food can be eaten. Additionally, an induction cooktop system in accordance with the principals of the present invention contains preset settings that allow the user to cook the food to their desired setting each time. The benefits of utilizing an induction cooktop system in accordance with the principals of the present invention create a more desirable user experience, decrease the time to cook meals, and limits waste throughout the cooking and cleanup process.

In accordance with the principals of the present invention, an induction cooktop system is provided. An induction cooktop system in accordance with the principals of the present invention comprises a magnetic induction field cooking and heating apparatus and induction cookware. The magnetic induction field cooking and heating apparatus is comprised primarily of a controller and induction coil, which create a high frequency magnetic induction field to heat induction cookware, which will heat a food product.

The food product contains a food material, like pasta, inside of a package that is typically labeled with the appropriate settings for the user to communicate to the cooking device. The user interacts with a controller interface to communicate the setting that is presented on the food packaging to the controller within the induction cooktop. The controller interface could be a list of numbered buttons or settings on a keypad, a barcode scanner or another input mechanism such as a microphone. The controller can then reference a list of preset settings within its memory, which will determine the cook time and power output of the coil. The list of preset settings could be stored locally on the controller or the controller could access the information over Wi-Fi.

In an aspect of the present invention, cookware is specifically designed to be used while cooking with a magnetic induction field cooking device. Induction cookware in accordance with the principals of the present invention is comprised of an outer shell and an inner shell. The outer shell is made of a material that is substantially transparent to the magnetic flux, such as for example like plastic, ceramic, wood, and/or the like. The inner shell is made of a material designed to be heated by a high frequency magnetic induction field, such as for example a metallic material like stainless steel, iron, titanium, and/or the like.

The outside shell of the cookware will be substantially insulated from the inner shell, which will reduce heat transfer from the metallic inner shell to the outer shell. This can be accomplished by providing for a physical layer of insulation between the outer shell and the inner shell. This layer of insulation can be for example comprised of foam, fiberglass, gas, air, vacuum, and/or the like. Induction cookware in accordance with the principals of the present invention is capable of heating a food product within the cookware, while allowing the user to touch the outer shell of the cookware immediately after the cooking process has concluded without transferring substantial heat to their hands. The cookware could be constructed in many forms to cook or heat specific foods or drinks. For example, the cookware could be designed to brew a cup of coffee, or cook popcorn. The specific forms of cookware are all designed to work singularly with an induction cooktop.

Initial Considerations

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope or spirit of the present invention. Particular features of one or more of the embodiments described herein may be described with reference to one or more particular embodiments or figures that form a part of the present invention, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the present invention in any way.

Devices and parts that are connected to or in communication with each other need not be in continuous connection or communication with each other, unless expressly specified otherwise. In addition, devices and parts that are connected to or in communication with each other may communicate directly or indirectly through one or more connection or communication means or intermediaries, logical or physical.

A description of an aspect with several components in connection or communication with each other does not imply that all such components are required. To the contrary, a variety of optional components may be described to illustrate a wide variety of possible embodiments and in order to more fully illustrate one or more embodiments. Similarly, although process steps, method steps or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope or spirit of various embodiments in which, for example, functions may be executed out of order from that shown or discussed, including substantially concurrently or in reverse order, depending on the functionality involved, as would be understood by those having ordinary skill in the art.

Conceptual Architecture

Figure 1:
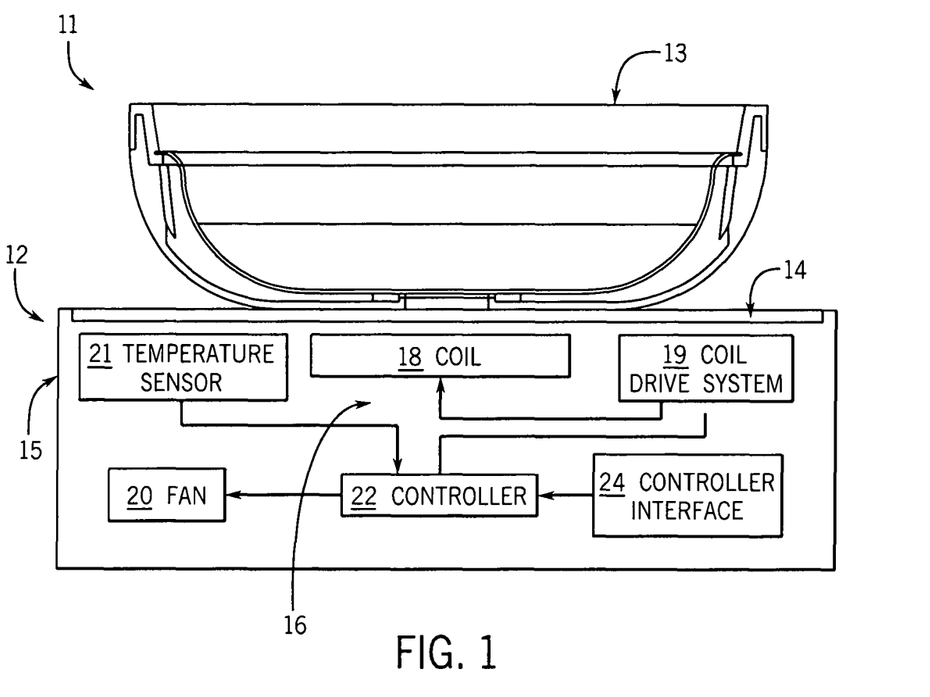
FIG. 1 is a diagram of an induction cooking system, according to an example embodiment in accordance with the principals of the present invention.

In more detail and referring to FIG. 1, a diagram of an induction cooking system 11 according to an example embodiment in accordance with the principals of the present invention is seen. The induction cooking system 11 is comprised primarily of an induction cooktop 12 and cookware 13. The induction cooktop 12 is comprised of a cooktop surface 14, a housing 15, and an induction heating system 16. The cooktop surface 14 can be made from a variety of materials including plastic, wood, glass, and the like. The induction heating system 16 is contained below the cooktop surface 14 and within the housing 15. The cookware 13 is located above the cooktop surface 14, centrally located above the coil 18 of the induction heating system 16.

The induction heating system 16 operates by driving an alternating current through the coil 18, creating an electromagnetic field or flux that induces eddy currents within the metallic material of the inner shell of the cookware 13. The eddy currents within the metallic material cause the metallic material to increase in temperature. The induction heating system 16 is made up of a coil 18, coil drive system 19, one or more fans 20, a temperature sensor 21, and a controller 22. As described above, the coil drive system 19 creates alternating current within the coil 18. The coil drive system 19 is controlled by the controller 22. The controller 22 controls the coil drive system 19 and the fans 20 by executing commands that are saved within its memory 25 as software or firmware.

The controller interface 24 and temperature sensor 21 provide input to the controller 22 to prompt the execution of specific commands. The controller 22 can preferably be a microprocessor and the memory 25 within the controller 22 may include for example a combination of random access memory (RAM), read only memory (ROM), nonvolatile random-access memory (NVRAM), and/or the like.

The one or more fans 20 contained within the induction heating system 16 are designed to cool the components of the induction heating system 16. As the cookware 13 increases in temperature, some of the heat can be transferred to the cooktop surface 14, which can transfer the heat to the controller 22 and coil drive system 19. Additionally, the controller 22 and coil drive system 19 will produce heat. The controller 22 and coil driver system 19 do not have a high resistance to heat, so the controller 22 and coil driver system 19 can be actively cooled by the fans 20.

The induction heating system 16 contains a temperature sensor 21, which actively monitors the temperature of the cookware 13. If the temperature increases beyond a desired level, then the controller 22 will reduce/lower the power being produced by the induction heating system 16. If the temperature of the cookware 13 increases beyond a desired limit, then the controller 22 may also completely turn off the power of the induction heating system 16. By maintaining a safe temperature of the cookware 13 using the temperature sensor 21, the components within the induction heating system 16 are also protected from overheating. The use of a temperature sensor 21 is an important safety feature to ensure that the cookware 13 does not overheat and cause damage to the cooktop, or harm to the user. More detail on the temperature sensor 21 is provided below.

Figure 2:
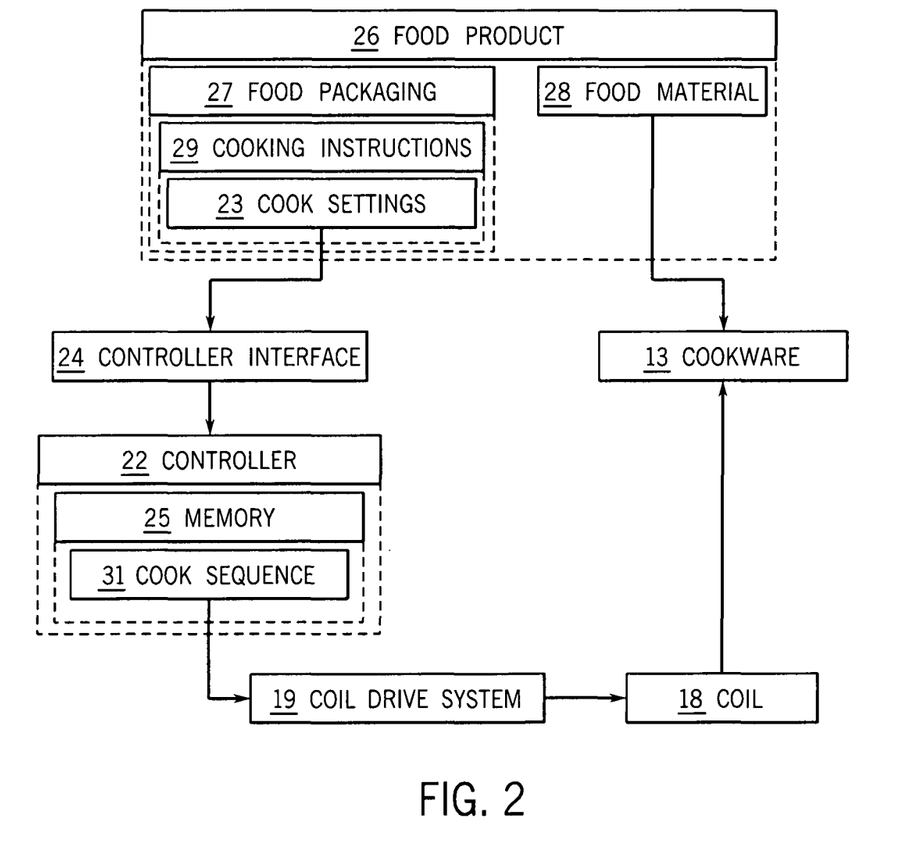
FIG. 2 is a block diagram of a cooking process using an induction cooking system, according to an example embodiment in accordance with the principals of the present invention.

As depicted in FIG. 2, the food product 26 is made up of the food packaging 27, food material 28, and cooking instructions 29. The food material 28 can contain solids, liquids or both. For example, the food product 26 could contain: soup, rice, pasta, pizza, coffee, tea, popcorn or any other food materials or combinations of food materials. To begin the cook process the user obtains a food product 26 and uses the cooking instructions 29 to prepare the food material 28 within the cookware 13. In this embodiment, the food product contains the cooking instructions; however, cooking instructions could be communicated to the user through a variety of methods, including but not limited to: internet forums, internet social networking websites, cookbooks, ebooks and the like.

The user interacts with the controller interface 24 to select the cook settings 23 described in the cooking instructions 29.

The controller interface 24 sends the user generated input to the controller 22 to begin the cook process. In addition to manually entering the cook settings, the controller interface 24 could contain preset settings that the user can select to begin cooking. As depicted in FIG. 2, the user selects a preset setting. The controller interface 24 then accesses the memory 25 of the controller 22 to initiate the designated cook settings 31.

Each cook preset setting consists of a cook sequence 31 that applies power to the coil drive system 19 for a predetermined amount of time. For example, the cook sequence 31 could consist of applying power of 300 Watts for 5 minutes. Another example cook sequence 31 could consist of applying power of 500 Watts for 2 minutes and then 300 Watts for an additional 8 minutes. Each food product 26 can be designed to be cooked with a specific cook sequence 31. While FIG. 2 depicts the user using cook presets to communicate the intended cook sequence 31, the user can also enter the cook sequence 31 manually by interacting with the controller interface 24. Each cook sequence 31 is designed to cook the food material 28 to optimal conditions within the cookware 13.

The controller interface 24 can use a variety of methods to obtain the desired cook settings 23 from the user or from the food packaging 27. These methods could include, but are not limited to a touchscreen, a number pad, a digital interface, buttons, barcode scanning, matrix barcode scanning, voice control or radio-frequency identification (RFID) communication with an RFID tag in the food packaging 27 of the food product 26. If a method is used for communicating cook settings 23, the corresponding hardware and software can be included within the induction cooktop 12 to communicate the information to the controller 22. For example, if a barcode is used to communicate a cook setting 23, then the induction cooktop 12 will include a barcode scanner and the food product 26 would display a barcode on the food packaging 27.

Figure 3:
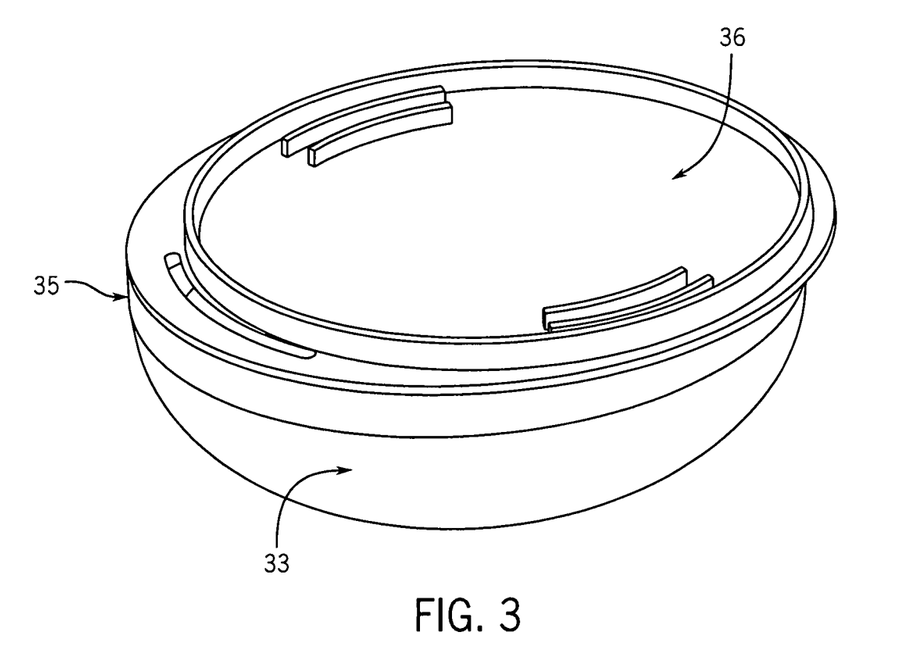
FIG. 3 is an isometric view of the cookware, according to an example embodiment in accordance with the principals of the present invention.
Figure 4:
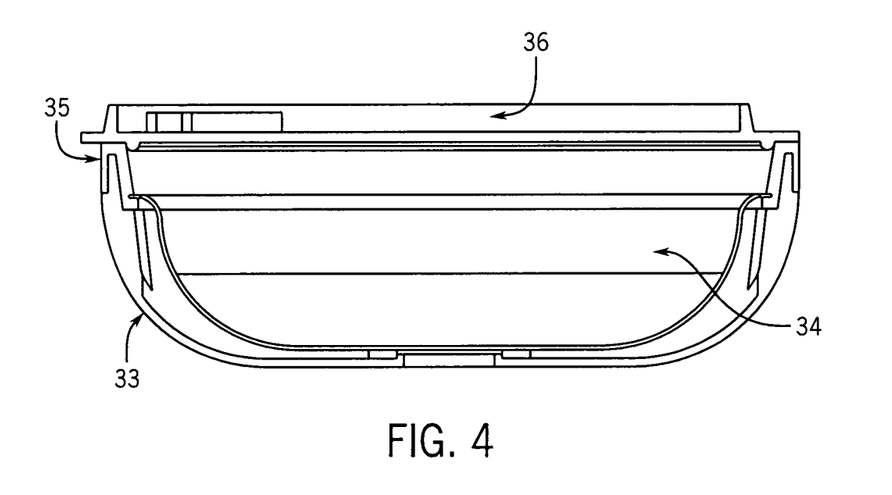
FIG. 4 is a cross-sectional view of the cookware, according to an example embodiment in accordance with the principals of the present invention.

FIG. 3 and FIG. 4 depict cookware 13 that is made up of an outer shell 33, an inner shell 34, an interface ring 35, and a lid 36. The outer shell 33 is formed out of a thermally insulative material that is designed to reduce heat transfer between the inner shell and the hands of a user, which will grip the outside surface of the outer shell 33. An example of a thermally insulative material could be a polymer, a ceramic material, a rubber material or a wood material. The inner shell of the cookware is made of a metallic material like stainless steel, iron, titanium, and/or the like, and it is designed to be heated by a high frequency magnetic induction field. The inner shell is designed to be heated by the induction cooktop 12, and then transfer that heat to the food material 28. The inner shell 34 can also include a non-stick layer applied to the inside surface, or the surface that touches the food. The non-stick layer could contain a material like polytetrafluoroethylene (PTFE) that is designed to keep the food from sticking to the cookware 13.

The interface ring 35 connects the outer shell 33 to the inner shell 34. The interface ring 35 is designed to minimize heat transfer between the outer shell 33 and the inner shell 34, and can be a part of the outer shell 33, inner shell 34 or both. The interface ring 35 can be formed with a number of materials including polymers like polycarbonate or rubbers like silicone. The cookware 13 assembly is designed to keep water out of the insulated area between the outer shell 33 and the inner shell 34. Additionally, the cookware 13 assembly can be designed in a way that the user can disassemble in order to clean the individual parts.

The cookware 13 is designed to contain and transfer heat to the food material 28 during the cooking process 30. Following the conclusion of the cooking process, the cookware 13 can then be used as a vessel for eating the food. It is important that the outer shell 33 remains cool, less than 100 degrees Celsius, to ensure that the user can touch the surface when the cook process 30 is complete. The cookware 13 can be designed in a wide variety of shapes in order to cook and serve different types of food. These shapes include but are not limited to a bowl, pan, plate, pot, cup or mug, and can be designed to cook or heat food material 28 that is substantially solid, liquid or a combination of both. The cookware 13 can also include a lid 36 that can have a metallic inner surface facing the food. This surface can be used to heat the top surface of the food material 28, or provide an effect that adds a crisp or crunch to the top surface of the food material 28.

As previously introduced, the induction heating system 16 contains a temperature sensor 21, which actively monitors the temperature of the cookware 13. The use of a temperature sensor 21 is an important safety feature to ensure that the cookware 13 does not overheat and cause damage to the cooktop, or harm to the user. The temperature sensor 21 could utilize a variety of different sensor types like a thermistor or an infrared temperature sensor.

Figure 5:
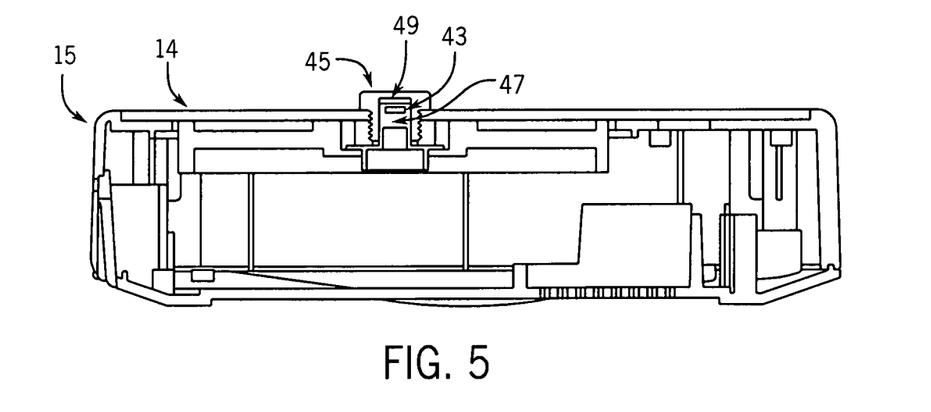
FIG. 5 is a cross-sectional view of the induction cooking system cooktop surface, according to an example embodiment in accordance with the principals of the present invention.

In an embodiment in accordance with the principles of the present invention, the temperature sensor 21 comprises a thermocouple 43 adapted to be in contact with the inner shell of the cookware. This ensures that the thermocouple sensor is directly reading the bowl temperature in a location close to where the heat is being generated. Referring to FIG. 5, the thermocouple 43 is seen extending upwardly through the cooktop surface 14. The thermocouple 43 is held in thermocouple housing 45 contained in a thermocouple mount 47 extending below the cooktop surface 14 and within the housing 15. The thermocouple sensor can be housed in a conductive material such as aluminum, which allows heat to rapidly pass through the housing so that the thermocouple sensor can actively sense the temperature of the bowl without delay. If the housing is fabricated using an electrically conductive material, then the thermocouple sensor will be electrically insulated from the sensor housing. This can be accomplished for example by using a thin layer of rubber 49 that rapidly transfers heat, but electrically insulates the sensor from the housing.

Figure 6:
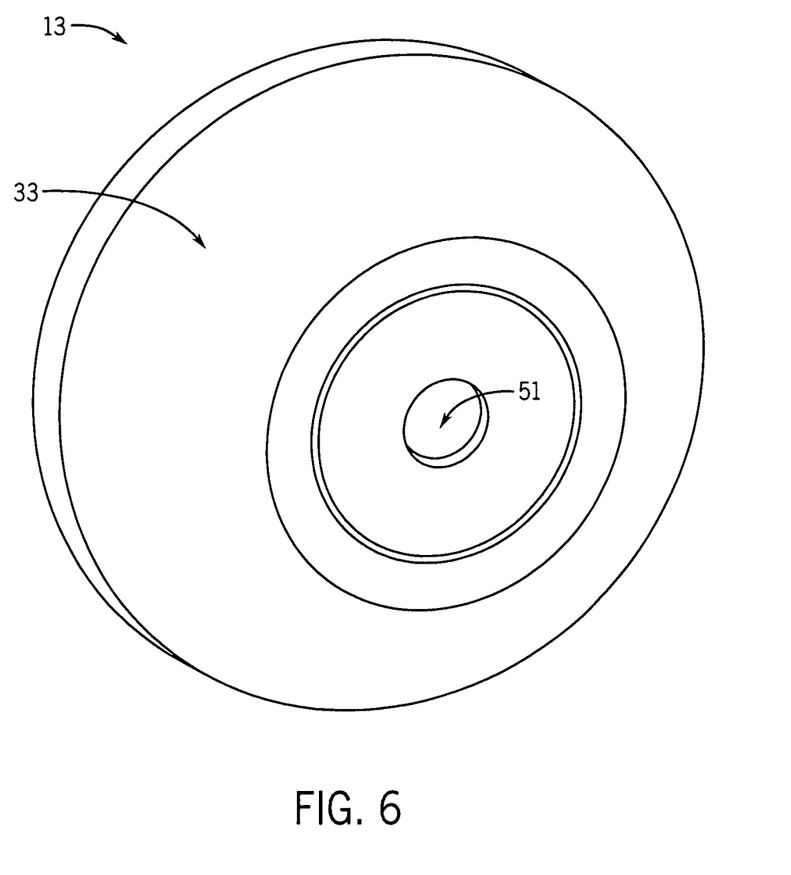
FIG. 6 is a view of the underside of cookware, according to an example embodiment in accordance with the principals of the present invention.
Figure 7:
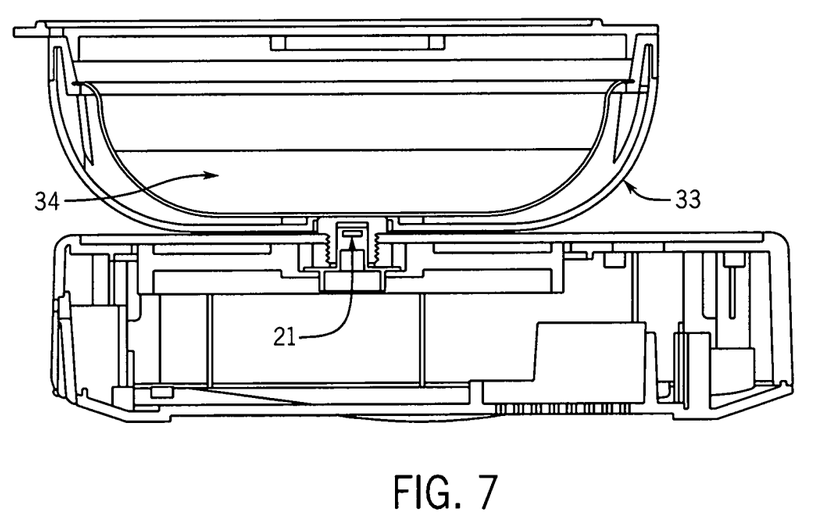
FIG. 7 is a cross-sectional view of the induction cooking system cooktop surface of FIG. 5 having the cookware of FIG. 6, according to an example embodiment in accordance with the principals of the present invention.

Thus, referring to FIG. 6 the underside of cookware 13 is seen. A thermal-insulation aperture 51 is defined in the outer shell 33 in order to allow temperature sensing access to the inner shell 34. In an embodiment in accordance with the principals of the present invention, to make physical contact with the inner shell 34, the thermocouple sensor 21 passes through the outer shell 33 of the cookware 13. This can be seen in FIG. 7.

While a system and apparatus in accordance with the principals of the present invention has been described with specific embodiments, other alternatives, modifications, and variations will be apparent to those skilled in the art. For example, in the described embodiment the temperature sensor makes physically contact with the inner shell; however, an alternative temperature sensor that measures the temperature while not in physical contact with of the inner shell such as, for example, an infrared thermal sensor contained within but capable of sensing temperature above the cooktop surface and through the thermal-insulation aperture could be utilized. Accordingly, it will be intended to include all such alternatives, modifications and variations set forth within the spirit and scope of the appended claims.

What is claimed is:

1. An induction cooking system comprising:
   a cooktop surface;
   an induction heating system contained below the cooktop surface, the induction heating system including a coil positioned immediately below the cooktop surface, wherein the coil is configured to produce an electromagnetic field when the coil is energized; and
   a temperature sensor, the temperature sensor sensing temperature above the cooktop surface; and
   custom cookware configured to be placed on the cooktop surface above the coil, the custom cookware comprising:
   an inner shell comprised of a metallic material to heat a food material;
   an outer shell comprised of a thermally insulative material that is substantially transparent to magnetic flux, the outer shell having an underside configured to rest on the cooktop surface above the coil during cooking; and
   defined in the outer shell on the underside of the custom cookware, a thermal-insulation aperture;
   wherein the temperature sensor extends temperature sensing above the cooktop surface and through the thermal-insulation aperture to the inner shell.

2. The induction cooking system of claim 1 further wherein the coil comprises a coiled copper wire underneath the cooktop surface, which creates a magnetic current throughout the inner shell to produce heat.

3. The induction cooking system of claim 1 further wherein the outer shell is comprised of a material selected from the group consisting of plastic, ceramic, rubber wood, and combinations thereof.

4. The induction cooking system of claim 1 further wherein the inner shell is comprised of a material selected from the group consisting of stainless steel, iron, titanium, and combinations thereof.

5. The induction cooking system of claim 1 further wherein the thermally insulative material is comprised of a material selected from the group consisting of foam, fiberglass, gas, air, vacuum, and combinations thereof.

6. The induction cooking system of claim 1 further wherein the cooktop surface is comprised of a material selected from the group consisting of plastic, wood, glass, and combinations thereof.

7. The induction cooking system of claim 1 further wherein the induction heating system comprises the coil, a coil drive system, a fan, and a controller.

8. The induction cooking system of claim 1 further wherein the temperature sensor comprises a thermocouple sensor that physically extends above the cooktop surface and through the thermal-insulation aperture to contact the inner shell.

9. The induction cooking system of claim 1 further wherein an interface ring connects the outer shell to the inner shell, the interface ring made of a material to minimize heat transfer between the outer shell and the inner shell.

10. The induction cooking system of claim 9 further wherein the interface ring is comprised of a material selected from the group consisting of a polymers, rubbers, and combinations thereof.

11. The induction cooking system of claim 1 further wherein insulation is contained between the outer shell and the inner shell.

* * * * *